United States Patent
Inoue et al.

(10) Patent No.: US 10,350,763 B2
(45) Date of Patent: Jul. 16, 2019

(54) POSTURE CONTROL DEVICE, ROBOT, AND POSTURE CONTROL METHOD

(71) Applicant: Sharp Kabushiki Kaisha, Sakai, Osaka (JP)

(72) Inventors: Takahiro Inoue, Sakai (JP); Akira Motomura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 240 days.

(21) Appl. No.: 15/319,812

(22) PCT Filed: Jun. 26, 2015

(86) PCT No.: PCT/JP2015/068567
§ 371 (c)(1),
(2) Date: Dec. 19, 2016

(87) PCT Pub. No.: WO2016/002673
PCT Pub. Date: Jan. 7, 2016

(65) Prior Publication Data
US 2017/0136628 A1  May 18, 2017

(30) Foreign Application Priority Data
Jul. 1, 2014 (JP) .................................. 2014-136245

(51) Int. Cl.
*B25J 13/02* (2006.01)
*B25J 11/00* (2006.01)
(Continued)

(52) U.S. Cl.
CPC ............... *B25J 13/02* (2013.01); *B25J 11/00* (2013.01); *B25J 13/081* (2013.01); *B25J 13/088* (2013.01);
(Continued)

(58) Field of Classification Search
CPC . B25J 13/02; B25J 11/00; B25J 13/088; B25J 13/081; B62D 57/032;
(Continued)

(56) References Cited

U.S. PATENT DOCUMENTS 6,415,203 B1 * 7/2002 Inoue ..................... B25J 19/005
700/245
6,773,344 B1 * 8/2004 Gabai ..................... A63H 3/28
463/1

(Continued)

FOREIGN PATENT DOCUMENTS

JP 2000-092164 A 3/2000
JP 2001-145139 A 5/2001
(Continued)

OTHER PUBLICATIONS

Official Communication issued in International Patent Application No. PCT/JP2015/068567, dated Sep. 15, 2015.

*Primary Examiner* — Jaime Figueroa
(74) *Attorney, Agent, or Firm* — Keating & Bennett, LLP

(57) ABSTRACT

The present invention enhances user convenience with regards to a user operation etc. of a robot conducted in response to a notification event. A posture control device (1) includes a notification event detecting section (13) configured to detect the notification event having occurred and a driving control section (15) that controls a driving section (24) so that in a case where the notification event detecting section (13) has detected an occurrence of the notification event, a robot (100) takes on a notification event posture.

6 Claims, 12 Drawing Sheets

(51) Int. Cl.
    *B62D 57/032*    (2006.01)
    *B25J 13/08*     (2006.01)
    *H04M 1/02*      (2006.01)
    *H04M 1/725*     (2006.01)

(52) U.S. Cl.
    CPC .. *B62D 57/032* (2013.01); *G05B 2219/40202* (2013.01); *G05B 2219/40411* (2013.01); *H04M 1/0202* (2013.01); *H04M 1/72519* (2013.01)

(58) Field of Classification Search
    CPC ............ H04M 1/72519; H04M 1/0202; G05B 2219/40411; G05B 2219/40202
    USPC .................................................. 700/245, 260
    See application file for complete search history.

(56) References Cited

U.S. PATENT DOCUMENTS

| | | | | |
|---|---|---|---|---|
| 7,219,064 | B2 * | 5/2007 | Nakakita | A63H 3/28 318/568.11 |
| 9,126,122 | B2 * | 9/2015 | Boeckle | A63H 3/28 |
| 9,522,341 | B2 | 12/2016 | Prestenback | H04N 7/17318 |
| 2001/0021882 | A1 * | 9/2001 | Hosonuma | B25J 9/1674 700/245 |
| 2002/0198717 | A1 * | 12/2002 | Oudeyer | G10L 13/033 704/270 |
| 2003/0078695 | A1 * | 4/2003 | Takagi | A63H 30/04 700/245 |
| 2003/0114959 | A1 * | 6/2003 | Sakamoto | G06N 3/008 700/245 |
| 2003/0130851 | A1 * | 7/2003 | Nakakita | A63H 3/28 704/275 |
| 2004/0093118 | A1 * | 5/2004 | Sabe | A63H 3/28 700/245 |
| 2004/0117063 | A1 * | 6/2004 | Sabe | G05B 19/4097 700/245 |
| 2004/0153212 | A1 * | 8/2004 | Profio | G06N 3/008 700/245 |
| 2004/0243281 | A1 * | 12/2004 | Fujita | B25J 9/1602 700/245 |
| 2005/0228540 | A1 * | 10/2005 | Moridaira | A63H 11/00 700/245 |
| 2007/0217586 | A1 * | 9/2007 | Marti | H04M 1/642 379/201.01 |
| 2010/0268359 | A1 * | 10/2010 | Prestenback | H04N 7/17318 700/94 |
| 2011/0021109 | A1 * | 1/2011 | Le | A63H 3/28 446/300 |
| 2013/0040530 | A1 * | 2/2013 | Matsuno | A63H 3/28 446/73 |
| 2014/0277735 | A1 * | 9/2014 | Breazeal | B25J 11/0005 700/259 |
| 2015/0096352 | A1 * | 4/2015 | Peterson | F24F 11/30 73/31.02 |
| 2016/0093107 | A1 * | 3/2016 | Yamamoto | A63F 13/92 345/633 |

FOREIGN PATENT DOCUMENTS

| | | |
|---|---|---|
| JP | 2004-306251 A | 11/2004 |
| JP | 2007-214908 A | 8/2007 |
| WO | 00/67960 A1 | 11/2000 |

* cited by examiner

FIG. 3

| NOTIFICATION EVENT | | ROTATION POSITION OF SERVOMOTOR | | | | NOTIFICATION EVENT POSTURE |
|---|---|---|---|---|---|---|
| | | FIRST SERVOMOTOR (ROTATION POSITION $\alpha$) | SECOND SERVOMOTOR (ROTATION POSITION $\beta$) | ... | N-TH SERVOMOTOR (ROTATION POSITION $\delta$) | |
| FIRST INCOMING TELEPHONE CALL | | ROTATION POSITION OF EACH SERVOMOTOR IS MAINTAINED AT TIME OF MOTION STOPPING | | | | MOTION STOPS ($A_1$) |
| SECOND INCOMING TELEPHONE CALL | No. 1 | a1 | b1 | ... | n1 | 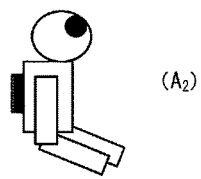 ($A_2$) |
| | No. 2 | $a21 < \alpha < a22$ | $b21 < \beta < b22$ | ... | $n21 < \delta < n22$ | |
| ALARM | No. 3 | a3 | b3 | ... | n3 | 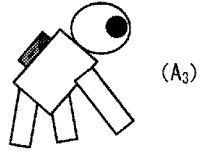 ($A_3$) |
| | No. 4 | $a41 < \alpha < a42$ | $b41 < \beta < b42$ | ... | $n41 < \delta < n42$ | |
| TURNING ON OF TV | No. 5 | a5 | b5 | ... | n5 | 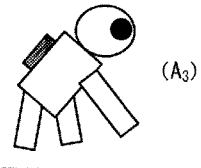 ($A_3$) |
| | No. 6 | $a61 < \alpha < a62$ | $b61 < \beta < b62$ | ... | $n61 < \delta < n62$ | |
| LOW BATTERY | No. 7 | a7 | b7 | ... | n7 | 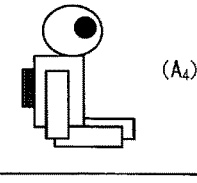 ($A_4$) |
| | No. 8 | $a81 < \alpha < a82$ | $b81 < \beta < b82$ | ... | $n81 < \delta < n82$ | |
| OTHER | | ROTATION POSITION OF EACH SERVOMOTOR IS MAINTAINED AT TIME OF MOTION STOPPING | | | | MOTION STOPS ($A_1$) |

FIG. 4

| No. | NOTIFICATION EVENT | NOTIFICATION EVENT GENERATION CONDITION |
|---|---|---|
| 1 | FIRST ALARM (WAKEUP ALARM) | 7:00 EVERY DAY |
| 2 | SECOND ALARM (SCHEDULED ALARM) | JANUARY 1, 2014, 10:00 |
| 3 | TURNING ON OF TV | EVERY MONDAY, 20:00, CHANNEL 1 |

| NOTIFICATION EVENT | STATUS OF ROBOT | NOTIFICATION EVENT POSTURE |
|---|---|---|
| FIRST INCOMING TELEPHONE CALL | USER IS NOT GRIPPING ROBOT | MOTION STOPS ($A_1$) |
| SECOND INCOMING TELEPHONE CALL | USER IS GRIPPING ROBOT |  ($A_2$) |

FIG. 11

| NOTIFICATION EVENT | PRIORITY |
|---|---|
| FIRST INCOMING TELEPHONE CALL | 2 |
| SECOND INCOMING TELEPHONE CALL | 1 |
| ALARM | 3 |
| TURNING ON OF TV | 5 |
| LOW BATTERY | 4 |
| OTHER | 6 |

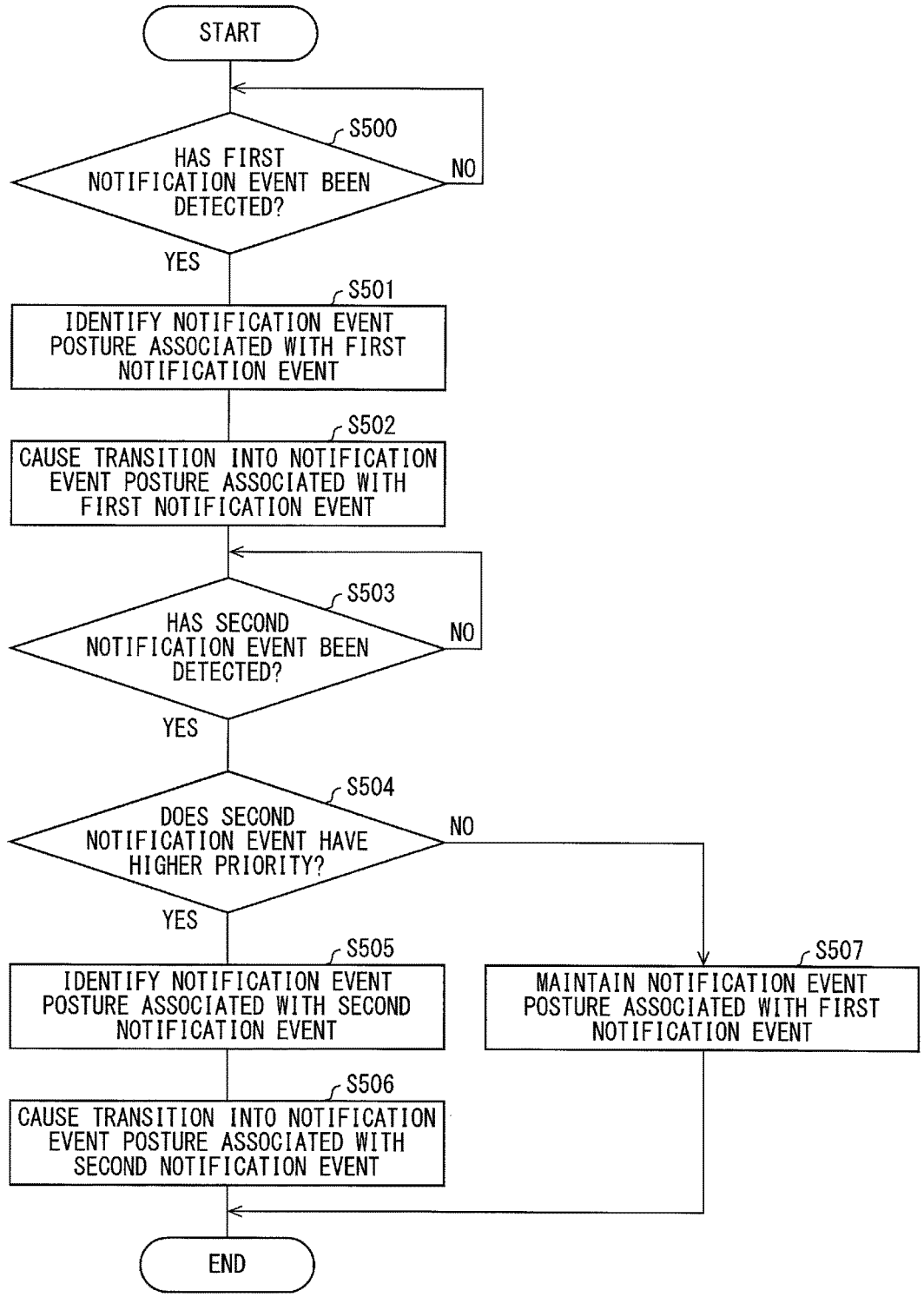

POSTURE CONTROL DEVICE, ROBOT, AND POSTURE CONTROL METHOD

TECHNICAL FIELD

The present invention relates to (i) a posture control device which controls a posture of a robot, (ii) a robot, and (iii) a program.

BACKGROUND ART

There have been known conventional techniques for providing notification of an incoming call, an incoming email, or the like received by a mobile device, by changing an exterior form of a mobile device body or a mobile device accessory. For example, Patent Literature 1 discloses an event notification mechanism in which a driving pattern generating section (i) generates a driving pattern signal in real time and (ii) sends the driving pattern signal to an actuator, so that an accessory of a communications terminal or the communications terminal as such changes in form. This notifies a user of an event that has occurred (e.g., an incoming call, incoming email, or reception of a digital TV broadcast, etc.).

CITATION LIST

Patent Literature

[Patent Literature 1]
Japanese Patent Application Publication Tokukai No. 2007-214908 (Publication date: Aug. 23, 2007)

SUMMARY OF INVENTION

Technical Problem

The event notification mechanism of Patent Literature 1 is, however, not configured so as to change the exterior form and/or the like by taking into account a user's possible operations which vary from event to event. As such, in a case where the user recognizes an event and conducts an operation in response thereto, the exterior form of the communications terminal may not necessarily have changed into a form appropriate for the user's operation. This may cause a problem that the user finds, in some cases, difficulty in attempting an operation.

The present invention was made in view of the above problem, and an object of an embodiment of the present invention is to enhance user convenience with regards to, for example, a user operation of a robot conducted in response to an event.

Solution to Problem

In order to solve the above problem, a posture control device in accordance with one aspect of the present invention controls a posture of a robot by controlling driving of a driving section included in a movable part of the robot, the posture control device including: a notification event detecting section configured to detect a notification event having occurred, the notification event being an event for which a user needs to take an action in response to the robot having notified the user; and a driving control section configured to control the driving section so that in a case where the notification event detecting section has detected an occurrence of the notification event, the robot takes on a notification event posture which is suited to a possible user response to the notification event.

Advantageous Effects of Invention

One aspect of the present invention enables a user to easily respond to a notification event that has occurred and thus enhances user convenience with regards to, for example, a user operation of a robot conducted in response to the notification event.

Figure 2:
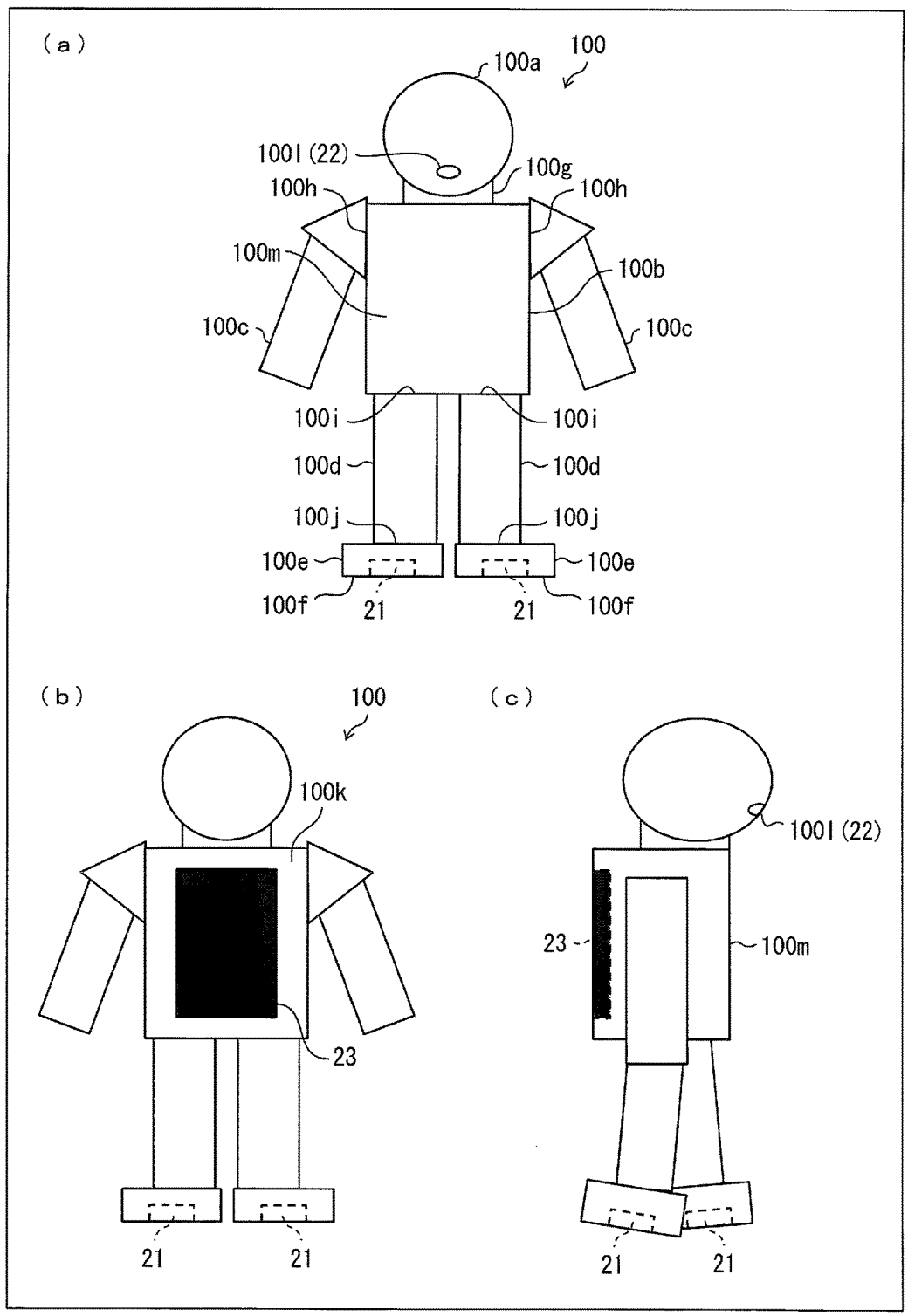

(a) of FIG. 2 is a schematic elevation view of the robot. (b) of FIG. 2 is a schematic rear view of the robot. (c) is a schematic side view of the robot.

FIG. 3 is an example of a notification event posture table stored in a storage section of the robot.

FIG. 4 is an example of a notification event generation table stored in the storage section of the robot.

Figure 5:
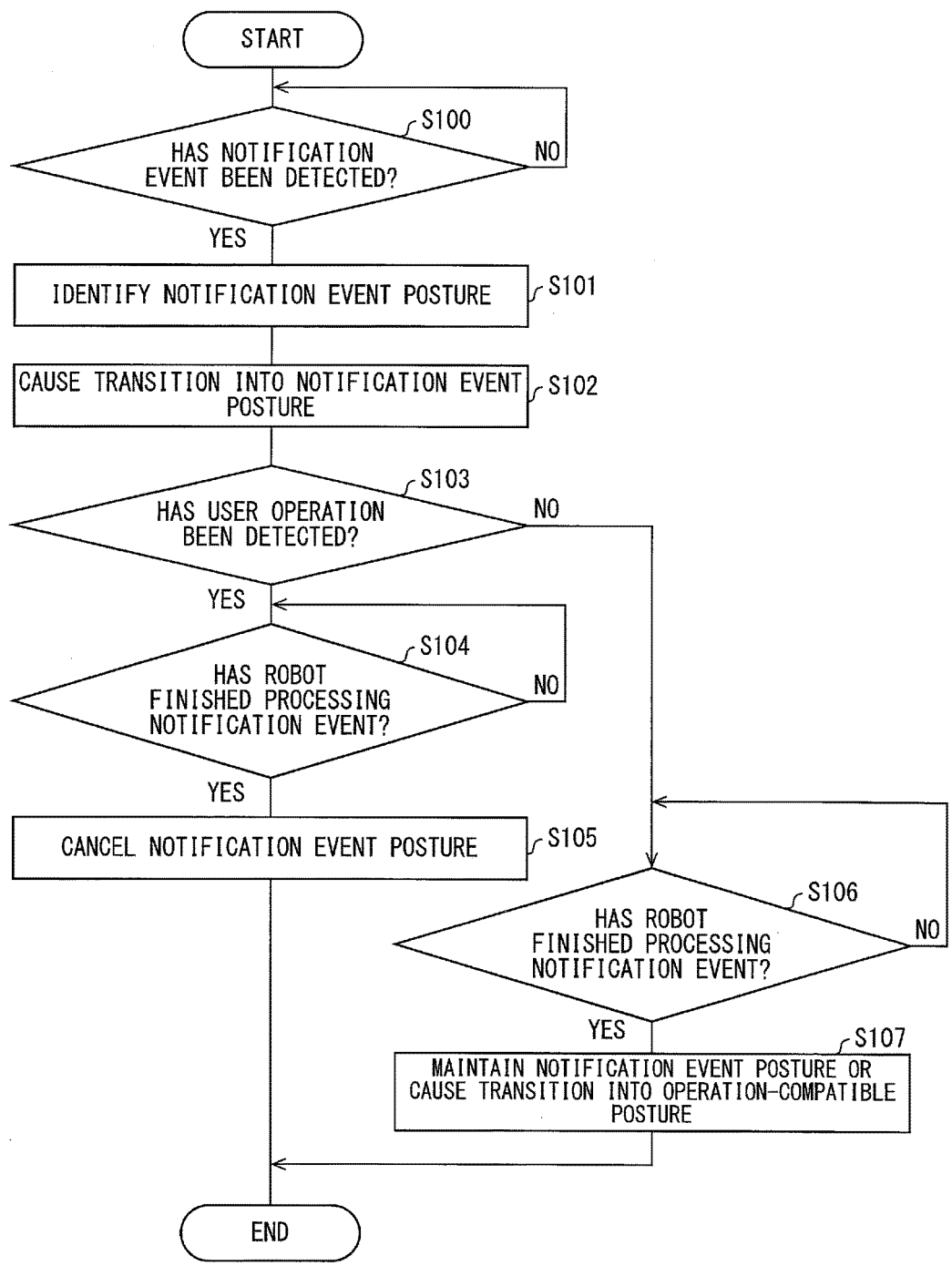

FIG. 5 is a flow chart illustrating how a posture device in accordance with Embodiment 1 of the present invention controls a posture of the robot (in a case where a notification event is brought about by an external factor).

Figure 6:
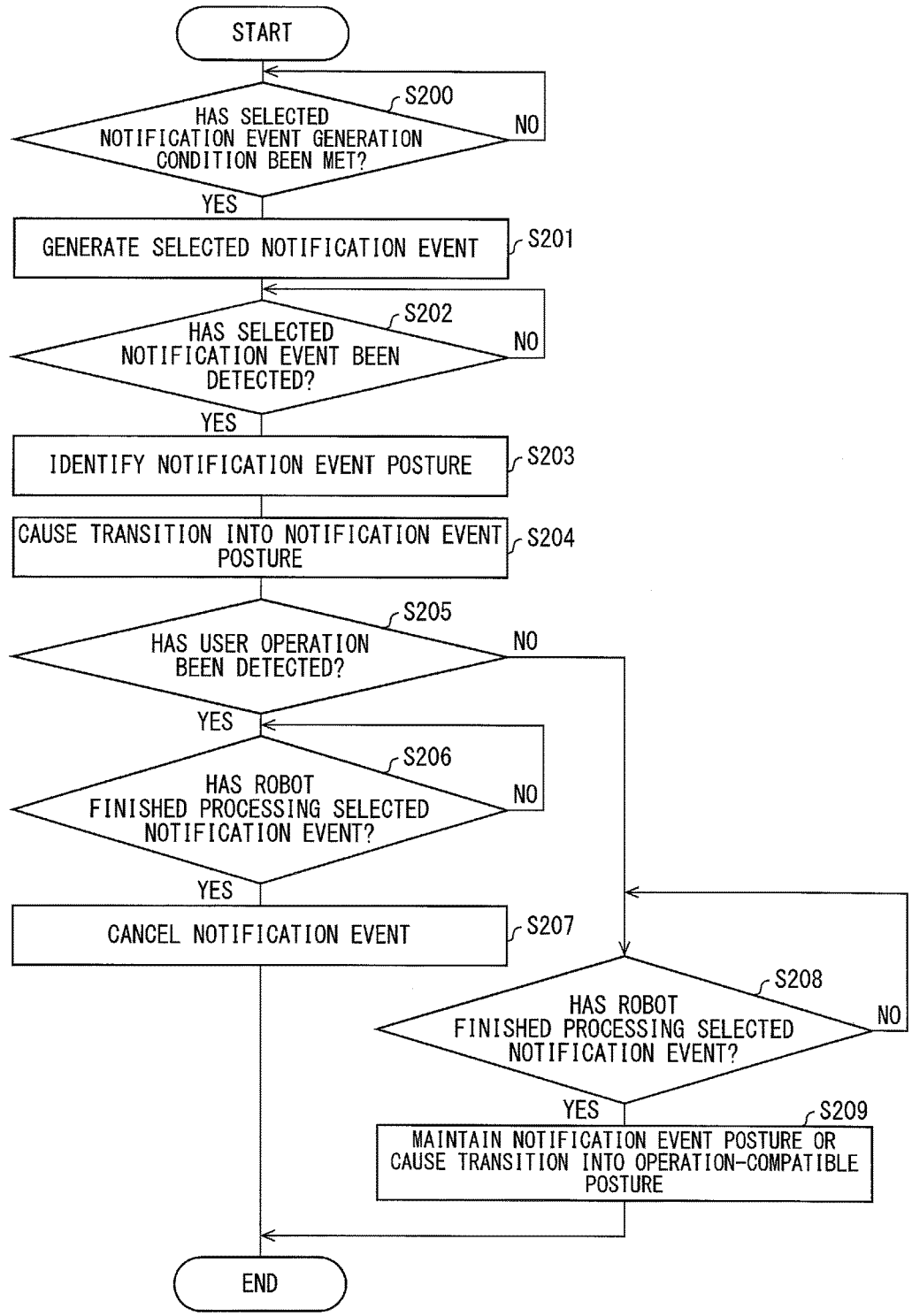

FIG. 6 is a flow chart illustrating how the posture device in accordance with Embodiment 1 of the present invention controls a posture of the robot (in the case of a selected notification event).

Figure 7:
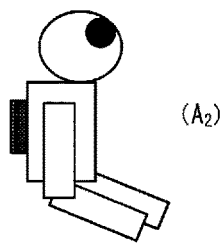

FIG. 7 is an example of a notification event posture table stored in a storage section of a robot in accordance with Embodiment 2 of the present invention.

Figure 8:
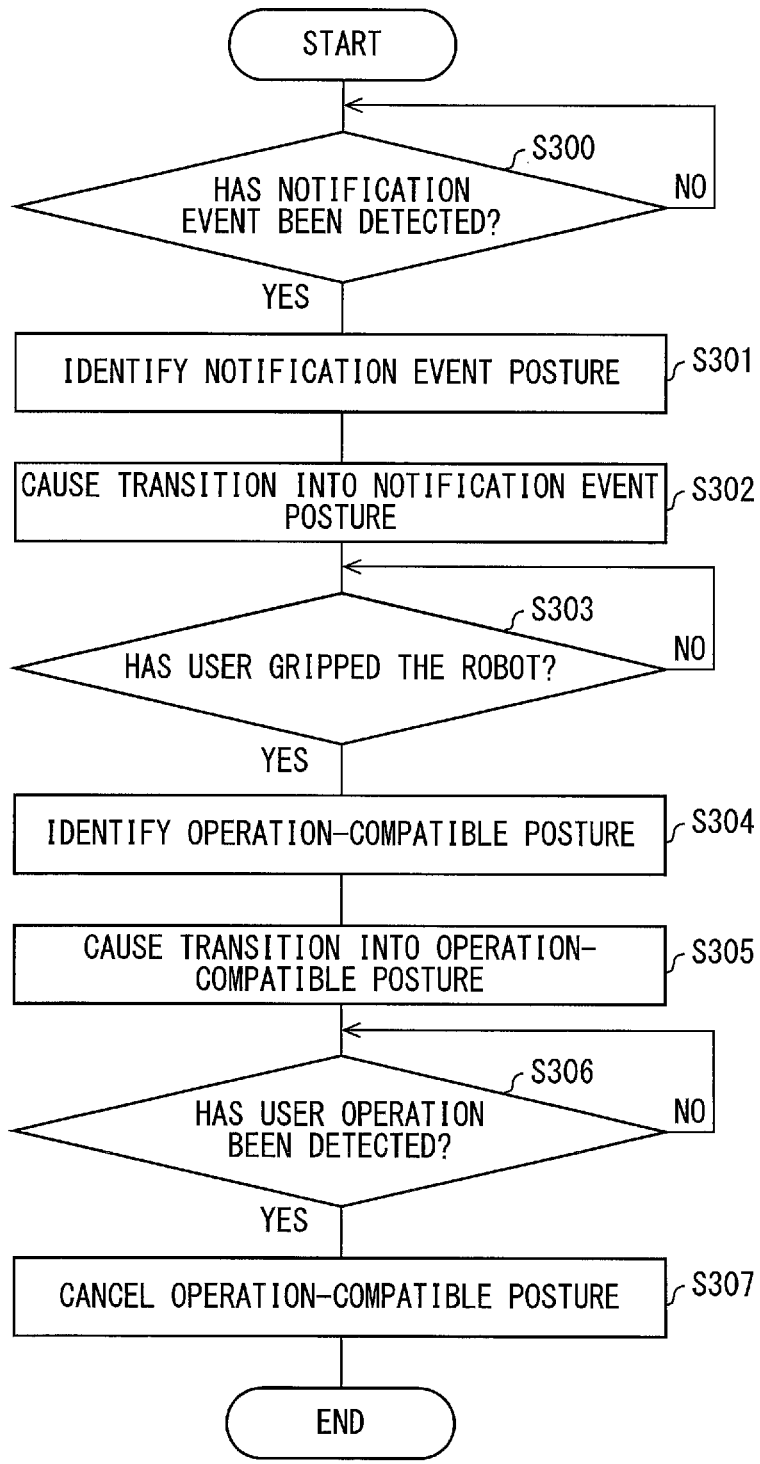

FIG. 8 is a flow chart illustrating how a posture control device in accordance with Embodiment 2 of the present invention controls a posture of the robot.

Figure 9:
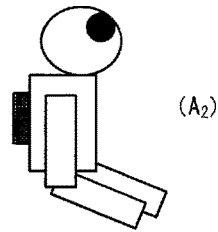

FIG. 9 is an example of a notification event posture table stored in a storage section of a robot in accordance with Embodiment 3 of the present invention.

Figure 10:
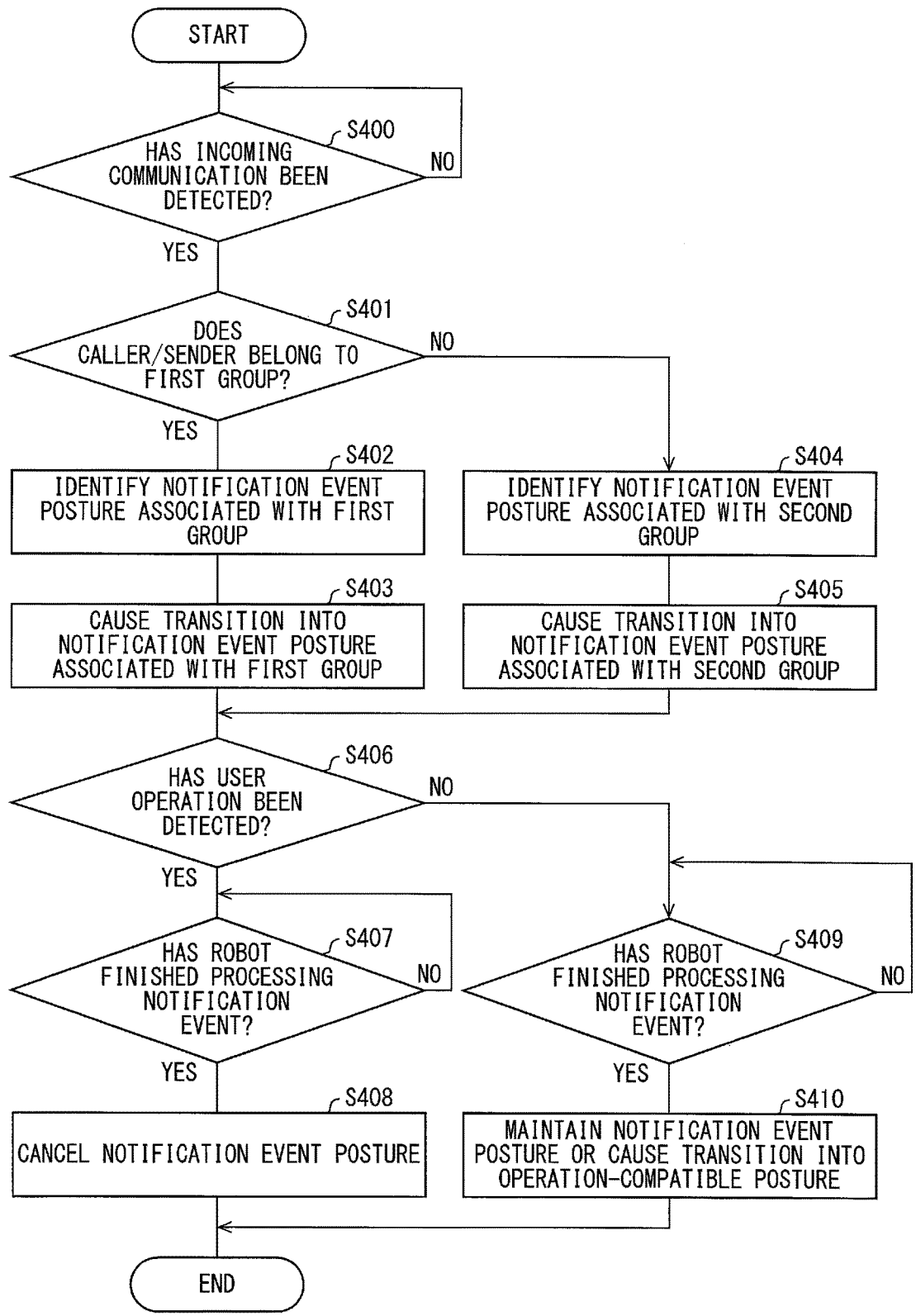

FIG. 10 is a flow chart illustrating how a posture control device in accordance with Embodiment 3 of the present invention controls a posture of the robot.

FIG. 11 is an example of a notification event posture table stored in a storage section of a robot in accordance with Embodiment 4 of the present invention.

FIG. 12 is a flow chart illustrating how a posture control device in accordance with Embodiment 4 of the present invention controls a posture of the robot.

DESCRIPTION OF EMBODIMENTS

[Embodiment 1]

The following description will discuss in detail Embodiment 1 of the present invention with reference to FIGS. 1 through 6. Embodiment 1 assumes that a posture control device is included in a bipedal humanoid robot, but this is a non-limiting example. The posture control device can be alternatively provided in any type of robot, such as a robot that resembles a combat robot in an animated cartoon or an animal-like robot. Note that Embodiment 1 and each subsequent embodiment is deals with, as an example, a bipedal humanoid robot having a mobile phone function.

(Outline of Robot)

First, the description below outlines a robot 100 with reference to FIG. 2. (a) of FIG. 2 is a schematic elevation view of the robot 100 in accordance with Embodiment 1. (b)

of FIG. 2 is a schematic rear view of the robot 100. (c) of FIG. 2 is a schematic side view of the robot 100.

The robot 100, as illustrated in (a) and (c) of FIG. 2, includes a head part 100a, a body part 100b, arm parts 100c, leg parts 100d and foot parts 100e. The robot 100 also includes (i) a neck part 100g via which the head part 100a is connected movably to the body part 100b, (ii) shoulder joint parts 100h via which the respective arm parts 100c are connected movably to the body part 100b, and (iii) leg joint parts 100i via which the respective leg parts 100d are connected movably to the body part 100b. The robot 100 further includes foot joint parts 100j via which the foot parts 100e are connected movably to the respective leg parts 100d. The neck part 100g and the various joint parts each contain a servo motor 24a (later described). Driving of the servo motors 24a allows movement of the head part 100a, the arm parts 100c, the leg parts 100d, and the foot parts 100e. The head part 100a includes a mouth part 100l which has a loudspeaker section 22 (described later), and each of the foot parts 100e includes a sole part 100f which has a microphone section 21 (later described).

As illustrated in (b) and (c) of FIG. 2, the body part 100b includes a back part 100k which has a display section 23 (later described). Note that the display section 23 is not limited to being provided on the back part 100k. The display section can be alternatively provided on, for example, an abdomen part 100m (see (a) and (c) of FIG. 2).

(Detailed Configuration of Robot)

Figure 1:
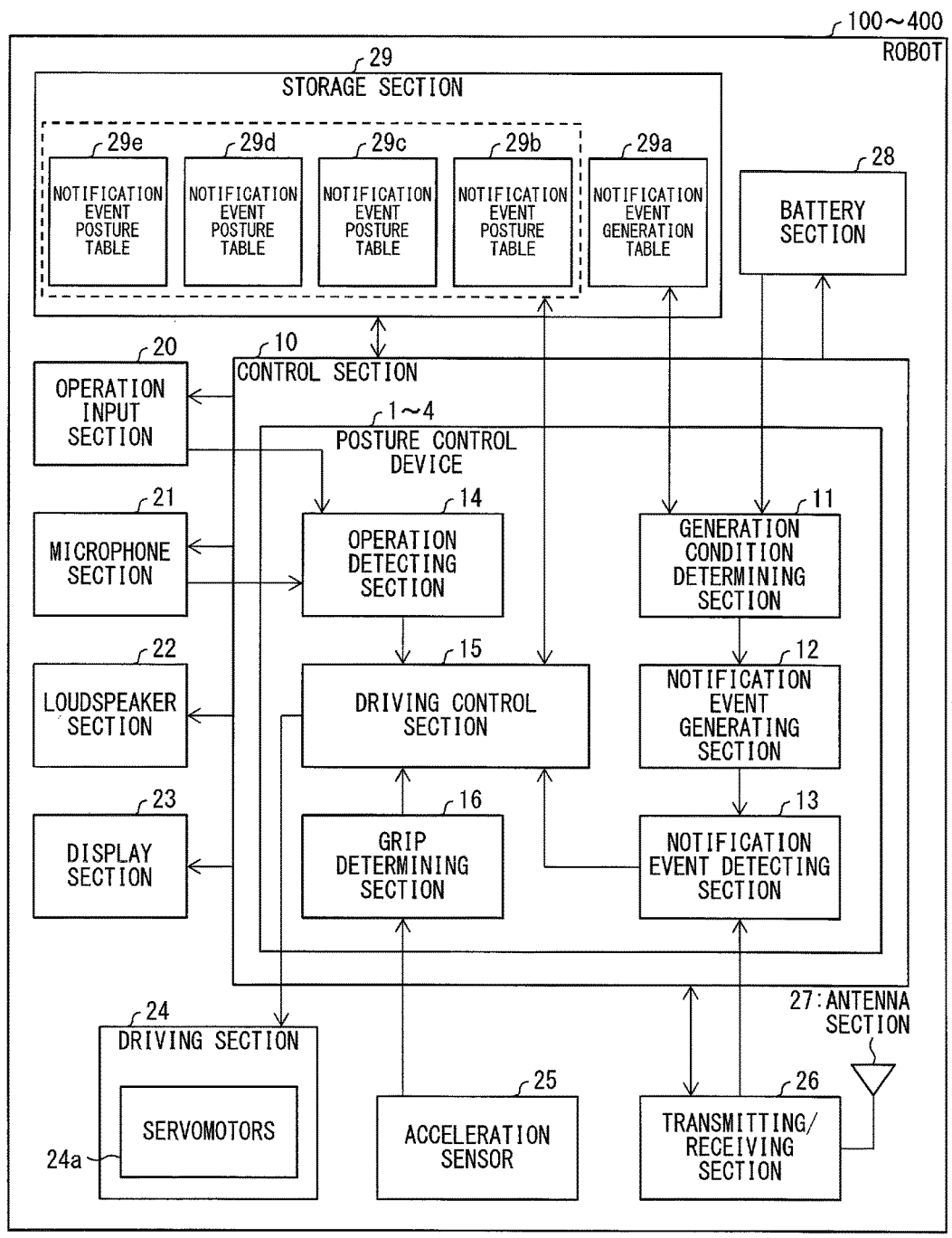
FIG. 1 is a block diagram schematically illustrating a configuration of a robot in accordance with Embodiment 1 of the present invention.

The following description will discuss a detailed configuration of the robot 100 with reference to FIGS. 1, 3, and 4. FIG. 1 is a block diagram illustrating a detailed configuration of the robot 100. As illustrated in FIG. 1, the robot 100 includes a control section 10, an operation input section 20, microphone sections 21, a loudspeaker section 22, a display section 23, a driving section 24, an acceleration sensor 25, a transmitting/receiving section 26, an antenna section 27, a battery section 28, and a storage section 29.

The control section 10 centrally controls the robot 100 and includes a posture control device 1. The posture control device 1, centrally controls various processes for controlling a posture of the robot 100 and will be described later in detail.

The operation input section 20 accepts a user operation that is entered. Examples of the operation input section 20 can encompass a touch panel and an optical sensor. The microphone sections 21 are each a microphone that picks up audio during, for example, a conversation. The loudspeaker section 22 serves as a reproduction section that has (i) a function of reproducing information including audio data and (ii) a function of a loudspeaker for outputting sound so as to be audible to a person other than the user. The display section 23 displays various images such as those images that are created while various functions (application software) installed in the robot 100 are carried out. For example, an LCD (liquid crystal display) having a touch panel is employed as the display section 23. The transmitting/receiving section 26 is configured to transmit and receive various types of data, such as audio data, via the antenna section 27. The battery section 28 is configured to supply electric power to the individual sections of the robot 100.

The driving section 24 drives various movable parts, of the robot 100, such as the head part 100a. The driving section 24 includes a plurality of servo motors 24a provided so that one of them is for the neck part 100g and the others are for the respective joint parts. Examples of the servo section 24 can include, other than the servo motors 24a of Embodiment 1, actuators such as a hydraulic cylinder, a pneumatic cylinder, and a linear actuator.

The acceleration sensor 25 detects whether or not a user is gripping the robot 100 and then sends a detection result to a grip determining section 16. Specifically, the acceleration sensor 25 detects whether or not the robot 100 is being gripped by detecting an angle of tilt of the robot 100 with respect to the direction of gravity. Note that Embodiment 1 is not limited to use of the acceleration sensor and can therefore include some other member for detecting whether or not the robot 100 is being gripped. Examples of such alternative members include a grip sensor, such as a capacitive sensor or a pressure-type sensor, and a gyroscopic sensor that detects an angular acceleration of the robot 100.

The following description will discuss a detailed configuration of the storage section 29. The storage section 29 stores, for example, a notification event occurrence table 29a, notification event posture tables 29b through 29e, and various control programs that the control section 10 executes. Examples of the storage section 29 include a nonvolatile storage device such as a hard disk and a flash memory. The notification event posture tables 29c through 29e will be described later.

FIG. 3 is an example of the notification event posture table 29b stored in the storage section 29. The notification event posture table 29b is a data table that shows correspondence between notification events, notification event posture information, and notification event postures. A notification event is an event, such as an incoming call and an alarm, of which the robot 100 notifies the user and for which the user needs to take an action in response to the notification. Examples of notification events include events brought about by internal factors of the robot 100 such as an alarm or turning on of TV, in addition to events brought about by external factors of the robot 100 such as an incoming call and incoming email. Notification events brought about by internal factors of robot 100 include a selected notification event (later described). A notification event posture refers to a posture of the robot 100 which posture is suited for a possible user response to a notification event. Notification event posture information refers to data relating to rotation positions, for each notification event posture, of the respective servo motors 24a.

Specifically, as is illustrated in No. 1 of FIG. 3, for example, an incoming call (the "second incoming call" in FIG. 3), serving as notification event, is associated with a notification event posture (A2) of the robot 100, the notification event posture (A2) being suited to the user gripping the robot 100 and talking during a call. The notification event posture (A2), which is associated with the incoming call, is a posture of the robot 100 in which the leg parts 100d are inclined toward the abdomen part 100m so that (i) the microphone section 21 provided in the sole part 100f is provided near the user's mouth and (ii) the loudspeaker section 22 provided in the mouth part 100l is provided near the user's ear. In the case of the notification event posture (A2), each of the servo motors 24a can be put in a non-driving state by, for example, being switched off. The incoming call and the notification event posture (A2) are associated with rotation positions $\alpha=a1$ through $\delta=n1$ of the respective first through n-th servo motors, which rotation positions correspond to the notification event posture (A2). That is, the incoming call and the notification event posture (A2) are associated with notification event posture information.

Note that although the rotation positions $\alpha$ through $\delta$ of the first through n-th servo motors, which correspond to the notification event posture associated with the incoming call, are exemplarily described as being a1 through n1 respectively, the rotation positions α through δ are not limited to being a specific value. For example, as shown in No. 2 of FIG. 3, the rotation positions α through δ can each encompass all values falling within a range, such as a21<α<a22 through n21<δ<n22.

Correspondence between (i) notification events, (ii) notification event posture information, and (iii) notification event postures is similar in a case where the notification event is an alarm, turning on of TV, or a low battery. Note that a notification event posture (A3) associated with the alarm and the turning on of TV is a posture of the robot 100 in which the body part 100b is inclined so that the user can easily recognize the display section 23, as is illustrated in No. 3 through No. 6 of FIG. 3. A notification event posture associated with the alarm and a notification event posture associated with the turning on of the TV can differ from each other, provided that each is a posture which allows the user to easily recognize the display section 23.

A notification event posture (A4) associated with a low battery is a posture suitable for charging, in which posture the robot 100 does not fall over even in a case where the robot 100 is in, for example, a deactivated state in order to enhance charging efficiency (a state in which each of the servo motors 24a is turned off or otherwise not driven). An example of the notification event posture (A4) is a sitting posture in which the body part 100b and the leg parts 100d form an angle that is substantially 90 degrees, as illustrated in No. 7 and No. 8 of FIG. 3. Note that in a case where the robot 100 is charged by plugging in a USB terminal or the like, the notification event posture associated with a low battery can be a posture in which a connection terminal of the robot 100 is exposed. In a case where charging is done wirelessly, the notification event posture associated with a low battery can be a posture which makes it easy for the user to grip the robot 100 and place the robot 100 on a charging platform.

In a case of an incoming call (the "first incoming call" in FIG. 3) or a notification event designated as "other," the robot 100 is controlled so as to maintain a posture of the robot 100 made at the point at which the incoming call etc. has occurred. That is, the robot 100 takes on a notification event posture (A1), caused by each movable part being driven in accordance with rotation positions α through δ of the respective first through n-th servo motors, which rotation positions are indicated by the notification event posture information associated with the first incoming call or the "other" notification events.

Next, FIG. 4 is an example of a notification event generation table 29a stored in the storage section 29. The notification event generation table 29a is a data table indicative of correspondence between a selected notification event and a selected notification event generation condition. A selected notification event refers to a notification event which has been selected by the user and which is generated via internal factors of the robot 100. A selected notification event generation condition refers to a condition which is necessary for a selected notification event to be generated and which the user can set at will.

As is shown in No. 1 of FIG. 4, in a case where the user selects a "first alarm (wakeup alarm)" as the selected notification event and sets "7:00 every day" as the selected notification event generation condition, data for the former and data for the latter are stored in the notification event generation table 29a so as to be associated with each other. This creates a process in which the first alarm goes off at 7:00 every day. Similarly, in a case where the user selects a "second alarm (scheduled alarm)" as the selected notification event and sets "Jan. 1, 2014, 10:00" as the selected notification event generation condition, data for the former and data for the latter are stored in the notification event generation table 29a so as to be associated with each other. This creates a process in which the second alarm goes off at 10:00 on Jan. 1, 2014 (No. 2 in FIG. 4). In a case where the user selects "turning on of TV" as the selected notification event and sets "every Monday, 20:00, channel 1" as the selected notification event generation condition, data for the former and data for the latter are stored in the notification event generation table 29a so as to be associated with each other. This creates a process in which the TV is turned on to channel 1 every Monday at 20:00 (No. 3 in FIG. 4).

Note that the user can select a notification event other than the three selected notification events shown in FIG. 4. For example, in a case where the user selects "low battery" as the selected notification event, a threshold set at will by the user can be set as the selected notification event generation condition, and the selected notification event and selected notification event generation condition can be associated with each other so that a notification sound indicating a low battery is played when a remaining amount of battery power drops below the threshold.

Next, the following describes a detailed configuration of the posture control device 1. The posture control device 1 includes a generation condition determining section 11, a notification event generating section 12, a notification event detecting section 13, an operation detecting section 14, a driving control section 15, and a grip determining section 16.

The generation condition determining section 11 determines whether or not a selected notification event generation condition has been satisfied and then provides a determination result to the notification event generating section 12. The notification event generating section 12 generates a selected notification event upon receiving, from the generation condition determining section 11, a determination result indicating that the selected notification event generation condition has been satisfied. The notification event detecting section 13 detects an occurrence of a notification event and then provides a detection result to the driving control section 15.

The operation detecting section 14 detects, while the robot 100 is in a notification event posture, the absence or presence of a user operation conducted in response to the notification event. The operation detecting section 14 then sends a detection result to the driving control section 15. The absence or presence of the user operation is detected (i) by, for example, in the case of an incoming call, determining whether or not the microphone section 21 has picked up the user's voice or (ii) by, for example, in a case where an alarm has gone off, determining whether or not the user carries out a muting operation, via the operation input section 20, in order to mute an alarm sound.

In a case where the driving control section 15 receives, from the notification event detecting section 13, a detection result indicating that a notification event has occurred, the driving control section 15 controls each of the servo motors 24a such that the robot 100 takes on a notification event posture. This causes the posture of the robot 100 to be controlled. The driving control section 15 also controls each of the servo motors 24a to be driven in accordance with a detection result received from the operation detecting section 14. This causes the posture of the robot 100 to be controlled. Specifically, in a case where the driving control section 15 receives a detection result indicating the presence of a user operation, the driving control section 15 controls each of the servo motors 24a so that the notification event posture is cancelled. Conversely, in a case where the driving control section 15 receives a detection result indicating the absence of a user operation, the driving control section 15 controls each of the servo motors 24a so that the notification event posture is maintained or so that the robot 100 takes on an operation-compatible posture.

That is, the driving control section 15 needs only to be able to control the robot 100 to undergo a transition into a posture which enables the user to easily take a next possible action involving the robot 100.

Note that the cancellation of a notification event posture refers to such things as the driving control section 15 controlling the robot 100 to (i) restart a motion that was being made prior to occurrence of a notification event or (ii) transition to a stand-by posture in which the robot 100 stands erect and motionless.

Maintaining a notification event posture refers to, for example, maintaining the notification event posture (A3) illustrated in No. 3 or No. 4 of FIG. 3 in a case where an alarm goes off as a notification event and a sounding period of the alarm elapses without the user confirming the details of the alarm.

An operation-compatible posture refers to a posture of the robot 100 which posture is suited to an operation of the robot 100 conducted by the user. A notification event posture may be employed as the operation-compatible posture. For example, in a case where an incoming call occurs as a notification event, the notification event posture (A2) illustrated in No. 1 or No. 2 of FIG. 3, which posture is suited to a user gripping the robot 100 and talking on the phone, can serve as the operation-compatible posture.

The grip determining section 16 determines whether or not the user is gripping the robot 100 in accordance with a detection result received from the acceleration sensor 25.

(Controlling of Posture of Robot by Posture Control Device)

The following description will discuss, with reference to FIG. 5, how the posture control device 1 controls a posture of the robot 100 in the case of a notification event brought about by an external factor. FIG. 5 is a flow chart showing how the posture control device 1 controls posture.

As is shown in FIG. 5, in a case where the notification event detecting section 13 has detected the occurrence of a notification event (YES), the notification event detecting section 13 sends, to the driving control section 15, a detection result indicating such (S100: notification event detecting step). In a case where the notification event detecting section 13 has detected no occurrence of a notification event (NO), the notification event detecting section 13 detects again whether or not a notification event has occurred (S100: notification event detecting step).

In a case where the driving control section 15 receives, from the notification event detecting section 13, the notification result indicating that the notification event has occurred, the driving control section 15 identifies, by referring to the notification event posture table 29b, a notification event posture associated with the notification event (S101: notification event posture identifying step). The driving control section 15 then controls the robot 100 so as to undergo a transition into the notification event posture thus identified (S102: notification event posture transition step).

In a case where the operation detecting section 14 detects, while the robot 100 is in a notification event posture, a user operation conducted in response to the notification event (YES), the operation detecting section 14 sends, to the driving control section 15, a detection result indicating such (S103: operation detecting step). In a case where the operation detecting section 14 does not detect the user operation (NO), the operation detecting section 14 sends, to the driving control section 15, a detection result indicating such (S103: operation detecting step).

In a case where the driving control section 15 receives, from the operation detecting section 14, the detection result indicating that the user operation has been detected ("YES" in step S103), the driving control section 15 determines whether or not the robot 100 has finished processing the notification event (S104: processing determining step). In a case where the driving control section 15 determines that the processing has been finished ("YES" in step S104), the driving control section 15 cancels the notification event posture (S105: posture cancelling step). In a case where the driving control section 15 determines that the processing has not been finished ("NO" in step S104), the driving control section 15 determines again whether or not the process has been finished (S104: processing determining step).

In a case where the driving control section 15 receives, from the operation detecting section 14, a detection result indicating that a user operation has not been detected ("NO" in step S103), the driving control section 15 determines whether or not the robot 100 has finished processing the notification event (S106: processing determining step). Thereafter, in a case where the driving control section 15 determines that the processing has been finished, ("YES" in step S106), the driving control section 15 controls the robot 100 to maintain the notification event posture or controls the robot 100 to undergo a transition to an operation-compatible posture (S107: following operation-compatible step). In a case where the driving control section 15 determines that the processing has not been finished ("NO" in step S106), the driving control section 15 determines again whether or not the robot 100 has finished the processing (S107: processing determining step).

The following description will discuss, with reference to FIG. 6, how the posture control device 1 controls a posture of the robot 100 in the case of a selected notification event. FIG. 6 is a flow chart showing how the posture control device 1 controls posture. Note that in FIG. 6, steps S202 through S209 are identical to steps S100 through S107 of FIG. 5, and as such, a description thereof will be omitted.

As is shown in FIG. 6, the generation condition determining section 11 first determines, by referring to the notification event generation table 29a, whether or not a selected notification event generation condition has been satisfied. Specifically, in a case where a the generation condition determining section 11 determines that the selected notification event generation condition has been satisfied (YES), the generation condition determining section 11 sends, to the notification event generating section 12, a determination result indicating such (S200: generation condition determining step). In a case where the generation condition determining section 11 determines that the selected notification event generation condition has not been satisfied (NO), the generation condition determining section 11 determines again whether or not a selected notification event generation condition has been satisfied (S200: generation condition determining step).

Next, in a case where the notification event generating section 12 receives, from the generation condition determining section 11, a determination result indicating that the selected notification event generation condition has been satisfied, the notification event generating section 12 generates a selected notification event associated with the selected notification event generation condition (S201: selected notification event generating step).

(Effect)

As described above, with the configuration of Embodiment 1, in a case where the occurrence of a notification event has been detected, the posture control device 1 controls each of the servo motors 24a so that the robot 100 takes on a notification event posture. This enables the user to easily respond to the notification event that has occurred and therefore enhances user convenience with regards to, for example, a user operation of the robot 100 conducted in response to the notification event.

With the configuration of Embodiment 1, in a case where a user operation in response to a notification event is detected while the robot 100 is in a notification event posture, the posture control device 1 cancels the notification event posture. This makes it possible to change the posture of the robot 100 into a posture, such as an operation-compatible posture, which facilitates an action in accordance with the user operation.

Because the user operation in response to the notification event is conducted before the robot 100 finishes processing of the notification event, it is unlikely that the user will conduct an operation of the robot 100 after the robot finishes the processing. It is therefore unnecessary to maintain the notification event posture after the processing has finished. With the configuration of Embodiment 1, a notification event posture is not needlessly maintained after processing thereof has finished. This enables the robot 100 to undergo a smooth transition into the user's intended driving.

In a case where a user operation is not conducted in response to a notification event before the robot 100 finishes processing the notification event, it is highly likely that the user will conduct an operation after the robot 100 finishes the processing. With the configuration of Embodiment 1, it is possible, after the robot 100 finishes the processing, to (i) maintain a notification event posture or (ii) change the posture of the robot 100 into an operation-compatible posture. This enables the user to easily conduct an intended response even after the robot 100 finishes the processing of the notification event.

With the configuration of Embodiment 1, the posture control device 1 can control the robot 100 to undergo a transition into a notification event posture associated with a selected notification event, in a case where the selected notification event has occurred. This enables the user to respond easily to not only a notification event that has occurred unexpectedly, but also to a selected notification event whose occurrence was intended by the user.

(Variation)

Note that the notification events, which have been described in Embodiment 1, are illustrative only, and are therefore not limited to as such. For example, an incoming email can also be included in examples of the notification event. Notification event postures associated with respective notification events are also not limited to those described in Embodiment 1. For example, a low battery (notification event) can be associated with a notification event posture in which the body part 100b of the robot 100 is inclined toward the back part 100k and palm parts of the arm parts 100c are in contact with the floor etc., as an alternative to the sitting posture illustrated in No. 7 and No. 8 of FIG. 3.

Note further that the generation condition determining section 11, the notification event generating section 12, the operation detecting section 14, and the grip determining section 16, included in the posture control device 1 of Embodiment 1, are not essential to the posture control device 1. That is, the posture control device 1 is not limited to a specific one, provided that it can control a posture of the robot 100 so that the user can easily respond to a notification event brought about by a factor external to the robot 100.

Whether the robot 100 maintains a notification event posture or undergoes a transition into an operation-compatible posture, can also be predetermined while being associated with each notification event. In this case, a table indicating the relevant correspondence is stored in the storage section 29, and in step S107, the driving control section 15 can determine, while referring to the table, whether the robot 100 maintains a notification event posture or undergoes a transitions into an operation-compatible posture, in accordance with the type of notification event that has occurred.

[Embodiment 2]

The following description will discuss Embodiment 2 of the present invention with reference to FIG. 7 and FIG. 8. For convenience, members having the same functions as those described in Embodiment 1 are given the same reference signs and explanations thereof are omitted.

A posture control device 2 in accordance with Embodiment 2 differs from the posture control device 1 of Embodiment 1 in that, in a case where a grip determining section 16 detects the user gripping a robot 200 while the robot 200 is in a notification event posture, a driving control section 15 controls the robot 200 to undergo a transition into an operation-compatible posture.

(Method of Controlling Robot to undergo a Transition into Operation-compatible Posture)

The following description will discuss, with reference to FIG. 7, how the driving control section 15 controls the robot 200 to undergo a transition into an operation-compatible posture. FIG. 7 is an example of a notification event posture table 29c stored in a storage section 29. The notification event posture table 29c is obtained by adding a column indicating "status of robot" to the notification event posture table 29b of FIG. 3. The notification event posture table 29c shows correspondence between various data stored in the notification event posture table 29b and data relating to the "status of robot." Data relating to the "status of robot" indicates whether or not the user is gripping the robot 200. Examples of the data include an angle of incline falling within a predetermined range, which angle is detected by an acceleration sensor 25. In such a case, an angle of incline, falling within the predetermined range, is stored as data indicating that the robot 200 is being gripped, and an angle of incline, falling outside the predetermined range, is stored as data indicating that the robot 200 is not being gripped. Note that for simplification of description, in FIG. 7, (i) the column "rotation position of servo motor" has been omitted and (ii) a case, where an incoming call has occurred, is described exemplarily.

As is shown in FIG. 7, in the case of occurrence of a first incoming call (an incoming call associated with a state in which the user is not gripping the robot 200, i.e., associated with data indicating "absence of gripping"), the driving control section 15 controls, while the user is not gripping the robot 200 after the occurrence of the first incoming call, the robot 200 to maintain its motion at a time point at which the first incoming call occurs. That is, the robot 200 takes on a notification event posture (A1).

Next, in a case where the grip determining section 16 determines, in accordance with a detection result received from the acceleration sensor 25, that the user is gripping the robot 200, the driving control section 15 controls the robot 200 to undergo a transition from the notification event posture (A1) into an operation-compatible posture. In such a case, the operation-compatible posture is changed into the notification event posture (A2) illustrated in No. 1 or No. 2 of FIG. 3, which posture (A2) enables a user to easily talk on the phone while the user is gripping the robot 200. Note that the incoming call, associated with a state in which the user is gripping the robot 200 (i.e., associated with data indicating presence of gripping), is referred to as the second incoming call.

(Controlling of Posture of Robot by Posture Control Device)

The following description will discuss, with reference to FIG. 8, how the posture control device 2 controls the robot 200 to change its posture. FIG. 8 is a flow chart showing how the posture device 2 controls the robot 200. Note that in FIG. 8, steps S300 through S302 are identical to steps S100 through S102 of FIG. 5, and as such, a description thereof will be omitted. Note also that the processing of FIG. 8 is discussed based on the assumption that the user is not gripping the robot 200 at the point at which the incoming call is detected in the step S300. That is, subsequent to the step S300, the driving control section 15 controls, by referring to the notification event posture table 29c, the robot 200 to undergo a transition into the notification event posture (A1) in accordance with a determination result from the grip determining section 16.

As shown in FIG. 8, in a case where the grip determining section 16 determines, in accordance with a detection result received from the acceleration sensor 25, that the user is gripping the robot 200 (YES), the grip determining section 16 sends, to the driving control section 15, a determination result indicating such (S303: grip determining step). In a case where the grip determining section 16 determines that the user is not gripping the robot 200 (NO), the grip determining section 16 determines again, in accordance with a detection result from the acceleration sensor 25, whether or not the user is gripping the robot 200 (S303: grip determining step).

In a case where the driving control section 15 receives, from the grip determining section 16, a determination result indicating that the user is gripping the robot 200, the driving control section 15 identifies, by referring to the notification event posture table 29c, an operation-compatible posture in accordance with a state where the user is gripping the robot 200 (S304: operation-compatible posture identifying step). Thereafter, the driving control section 15 controls the robot 200 to undergo a transition into an operation-compatible posture thus identified (S305: notification event posture transition step).

Next, in a case where the operation detecting section 14 has detected a user operation conducted in response to the notification event while the robot 200 is in the notification event posture (YES), the operation detecting section 14 sends, to the driving control section 15, a detection result indicating such (S306: operation detecting step). In a case where the operation detecting section 14 has not detected the user operation (NO), the operation detecting section 14 detects again whether or not the user operation has been conducted (S306: operation detecting step).

Next, in a case where the driving control section 15 receives, from the operation detecting section 14, a detection result indicating that the user operation has been detected ("YES" in step S306), the driving control section 15 cancels the notification event posture (S104: posture cancelling step).

(Effect)

As described above, the posture control device 2 of Embodiment 2 can control the robot 200 to undergo a transition into an operation-compatible posture. This enables a user to easily conduct an operation of the robot while gripping the robot. This makes it possible to further enhance user convenience with regards to a user operation of the robot conducted in response to a notification event.

Furthermore, the posture control device 2 Embodiment 2 can determine whether or not the robot 200 needs to change posture, in accordance with whether or not a user operation, conducted in response to a notification event, has been detected. In a case where, for example, the user operation has been detected, it is unlikely that the user will conduct another operation with respect to the robot 200 afterwards. As such, the robot does not need to maintain the notification event posture. This allows the posture control device 2 to determine that the notification event posture should be cancelled. On that account, the user can easily conduct a following action in accordance with how the user has operated the robot.

(Variation)

Note that the case where the driving control section 15 controls the robot 200 to change a posture from a notification event posture to an operation-compatible posture is not limited to a case where the notification event is an incoming call. Such a posture change can be made, for example, in the case of an incoming email, an alarm, etc.

Note also that the change in posture of the robot 200 made in accordance with presence or absence of a user operation which is conducted in response to a notification event is not limited to the change in posture of the robot 200 described in Embodiment 2 (i.e., in Embodiment 2, an operation-compatible posture is cancelled in a case where the user operation has been detected). For example, in a case where the robot 200 finishes processing a notification event in a state where the operation detecting section 14 has detected no user operation, the driving control section 15 can control the robot 200 to maintain the operation-compatible posture or to undergo a transition into another operation-compatible posture.

[Embodiment 3]

The following description will discuss Embodiment 3 of the present invention with reference to FIG. 9 and FIG. 10. For convenience, members having the same functions as those described in the above embodiment are given the same reference signs and explanations thereof are omitted.

A posture control device 3 in accordance with Embodiment 3 differs from the posture control devices 1 and 2 of respective Embodiments 1 and 2 in that in a case where an incoming call, email, etc. (hereinafter, "incoming signal") is detected as a notification event, a driving control section 15 of the posture control device 3 controls a robot 300 to undergo a transition into a notification event posture associated with a caller/sender that has been registered.

(Method of Controlling Robot to undergo a Transition into Notification Event Posture in a Case where Caller/Sender is Registered)

The following description will discuss, with reference to FIG. 9, how the driving control section 15 controls a robot to undergo a transition into a notification event posture in a case where a caller/sender is registered in the robot. FIG. 9 is an example of a notification event posture table 29d stored in the storage section 29.

The notification event posture table 29d is obtained by adding a column indicating "caller/sender" to the notification event posture table 29b of FIG. 3. The notification event posture table 29d shows correspondence between various data stored in the notification event posture table 29b and data relating to the "caller/sender." Individual callers/senders are divided into two groups, i.e., (i) a group of persons not favorable to the user (hereinafter referred to as a "first group") and (ii) a group of persons known to the user (hereinafter referred to as a "second group"). The names etc. of members belonging to each group are stored in the notification event posture table 29d as data relating to the "caller/sender". Further, incoming calls and data relating to the "caller/sender" are associated with each other such that an incoming call from a caller belonging to the first group is classified as a first incoming call, and an incoming call from a caller belonging to the second group is classified as a second incoming call.

Note that for simplification of description, in FIG. 9, (i) the column "rotation position of servo motor" has been omitted and (ii) a case where an incoming call, serving as a notification event, has occurred is described exemplarily. For example, the posture control device 3 in accordance with Embodiment 3 can also be applied to a case where an incoming email, serving as a notification event, has occurred.

As is shown in FIG. 9, in a case where the first incoming call has occurred, the driving control section 15 merely controls the robot 300 to maintain its posture at the time point at which the first incoming call has occurred. This is because it is unlikely that the user needs to respond to the first incoming call. That is, the robot 300 takes on the notification event posture (A1) which is associated with the first incoming call.

Conversely, in a case where the second incoming call has occurred, the driving control section 15 controls the robot 300 to undergo a transition into the notification event posture (A2) shown in No. 1 or No. 2 of FIG. 3, which posture is suited to the user gripping the robot 300 and talking on the phone. This is because it is highly likely that the user needs to respond to the second incoming call. That is, the robot 300 takes on the notification event posture (A2) which is associated with the second incoming call.

(Controlling of Posture of Robot by Posture Control Device)

The following description will discuss, with reference to FIG. 10, how the posture control device 3 controls the robot 300 to change its posture. FIG. 10 is a flow chart showing how the posture control device 3 controls the robot 300. Note that in FIG. 10, steps S406 through S410 are identical to steps S103 through S107 of FIG. 5, and as such, a description thereof will be omitted.

As is shown in FIG. 10, in a case where a notification event detecting section 13 has detected an incoming signal (incoming call) as a notification event (YES), the notification event detecting section 13 sends, to the driving control section 15, a detection result indicating such (S400: incoming signal detecting step). In a case where the notification event detecting section 13 has detected no incoming signal (NO), the notification event detecting section 13 detects again whether or not an incoming signal has occurred (S400: incoming signal detecting step).

Next, in a case where the driving control section 15 has received, from the notification event detecting section 13, a detection result indicating that an incoming signal has been detected, the driving control section 15 determines, by referring to the notification event posture table 29d, whether or not the caller/sender belongs to the first group (S401: group determination step).

In a case where the driving control section 15 has determined that the caller/sender belongs to the first group ("YES" in step S401), the driving control section 15 identifies, by referring to the notification event posture table 29d, a notification event posture associated with the first group (S402: notification event posture identifying step). Thereafter, the driving control section 15 controls the robot 300 to undergo a transition into the notification event posture (S403: notification event posture transition step). In a case where the driving control section 15 has determined that the caller/sender does not belong to the first group, i.e., that the caller sender belongs to the second group ("NO" in step S401), the driving control section 15 identifies, by referring to the notification event posture table 29d, a notification event posture associated with the second group (S404: notification event posture identifying step). Thereafter, the driving control section 15 controls the robot 300 to undergo a transition into the notification event posture (S403: notification event posture transition step).

(Effect)

As described above, in a case where an incoming signal is received, the posture control device 3 of Embodiment 3 controls the robot 300 to undergo a transition into a notification event posture associated with a registered caller/sender. This makes it possible for the user to appropriately respond in accordance with a registered caller/sender.

[Embodiment 4]

The following description will discuss Embodiment 4 of the present invention with reference to FIG. 11 and FIG. 12. For convenience, members having the same functions as those described in the above embodiment are given the same reference signs and explanations thereof are omitted.

A posture control device 4 in accordance with Embodiment 4 differs from the posture control devices 1 through 3 of respective Embodiments 1 through 3 in that in a case where a notification event includes a first notification event and a second notification event, a driving control section 15 controls a robot 400 to undergo a transition into a notification event posture associated with a notification event having a higher priority. Note that (i) a first notification event refers to a notification event occurring first and (ii) a second notification event refers to a notification event occurring after the first notification event occurs.

(Method of Controlling Robot to undergo a Transition into Notification Event Posture in a Case where a Plurality of Notification Events have Occurred)

The following description will discuss, with reference to FIG. 11, how the driving control section 15 controls the robot 400 to undergo a transition into a notification event posture in a case where a plurality of notification events have occurred. FIG. 11 shows an example of a notification event posture table 29e stored in the storage section 29.

The notification event posture table 29e is obtained by adding a column indicating "priority" to the notification event posture table 29b of FIG. 3. The notification event posture table 29e shows correspondence between various data stored in the notification event posture table 29b and "priority." Note here that the "priority" of notification events as shown in FIG. 11 is a mere example. The user can therefore set and change "priority" at will in accordance with the necessity of a response to a notification event. Note that for simplification of description, in FIG. 11, the columns "rotation position of servo motor" and "notification event posture" have been omitted.

As is shown in FIG. 11, in a case where, for example, a second incoming call (priority: 1) has occurred as the first notification event, the driving control section 15 controls the robot 400 to undergo a transition into a notification event posture (the notification event posture (A2) shown in No. 1 or No. 2 of FIG. 3) which is associated with the second incoming call.

In a case where, for example, an alarm (priority: 4) has occurred subsequently as the second notification event, the second incoming call has a higher priority. Accordingly, in a case where, at the time of the alarm, the robot 400 is in the process of a transition into the notification event posture (A2) associated with the second incoming call, the driving control section 15 controls the robot 400 to complete such a transition. In a case where, at the time of the alarm, the robot 400 has already completed the transition into the notification event posture (A2), the driving control section 15 controls the robot 400 to maintain the notification event posture (A2).

In a case where the alarm has occurred before the second incoming call, the driving control section 15 controls the robot 400 to undergo a transition into the notification event posture (A2) associated with the second incoming call, regardless of whether or not the robot 400 is in the process of a transition into a notification event posture (the notification event posture (A3) of FIG. 3) associated with the alarm.

Note that in a case where either the first notification event or the second notification event is an incoming call, one of the first and second incoming calls, which one is set in advance by the user, is selected.

(Controlling of Posture of Robot by Posture Control Device)

The following description will discuss, with reference to FIG. 12, how the posture control device 4 controls the robot 400 to take on a posture. FIG. 12 is a flow chart showing how the posture device 4 controls the robot 400. Note that in FIG. 12, steps S500 through S502 are identical to steps S100 through S102 of FIG. 5, and as such, a description thereof will be omitted.

As is shown in FIG. 12, in a case where a notification event detecting section 13 has detected an occurrence of the second notification event (YES), the event detecting section 13 sends, to the driving control section 15, a detection result indicating such (S503: second notification event detecting step). In a case where the notification event detecting section 13 has detected no second notification event (NO), the notification event detecting section 13 detects again whether or not the second notification event has occurred (S503: second notification event detecting step).

Next, in a case where the driving control section 15 receives, from the notification event detecting section 13, a detection result indicating that the second notification event has occurred, the driving control section 15 determines whether or not the second notification event has a higher priority than the first notification event (S504: priority determining step). In a case where the driving control section 15 has determined that the second notification event has a higher priority than the first notification event ("YES" in step S504), the driving control section 15 identifies, by referring to the notification event posture table 29e, a notification event posture associated with the second notification event (S505: notification event posture identifying step). Thereafter, the driving control section 15 controls the robot 400 to undergo a transition into the notification event posture (S506: following movement step). In a case where the driving control section 15 has determined that the second notification event has a lower priority ("NO" in step S504), the driving control section 15 controls the robot 400 to maintain a notification event posture associated with the first notification event (S507: following movement step).

In a case (not shown in FIG. 12) where (i) the driving control section 15 receives, from an operation detecting section 14, a detection result indicating that a user operation conducted in response to the notification event has been detected and (ii) the driving control section 15 determines that the robot 400 has finished processing of the notification event having a higher priority, the driving control section 15 can control the robot 400 to undergo a transition into a notification event posture associated with the notification event having a lower priority. In a case where (i) the driving control section 15 receives, from the operation detecting section 14, a detection result indicating that the user operation has not been detected and (ii) the driving control section 15 determines that the robot 400 has finished processing of the notification event having a higher priority, the driving control section 15 can control the robot 400 to maintain the notification event posture associated with the notification event having a higher priority. The driving control section 15 can alternatively control the robot 400 to undergo a transition into the notification event posture associated with the notification event having a lower priority.

(Effect)

As described above, with the configuration of Embodiment 4, in a case where (i) the second notification event has occurred subsequently to the first notification event, specifically, the second notification event has occurred in a state in which the first notification event is occurring and (ii) the first notification event has a higher priority, the driving control section 15 can, for example, control the robot 400 to undergo a transition into a notification event posture associated with the second notification event after the user has finished responding to the first notification event. In a case where (i) the second notification event has occurred subsequently to the first notification event, specifically, the second notification event has occurred in a state in which the first notification event is occurring and (ii) the second notification event has a higher priority, the driving control section 15 can, for example, control the robot 400 to undergo a transition into a notification event posture associated with the second notification event upon occurrence of the second notification event.

This enables the user to appropriately respond to whichever notification event has a higher priority, regardless of the order in which the first notification event and the second notification event have occurred.

[Software Implementation Example]

A control block of each of the posture control devices 1 through 4 (particularly the control section 10) can be realized by a logic circuit (hardware) provided in an integrated circuit (IC chip) or the like or can be alternatively realized by software as executed by a central processing unit (CPU).

In the latter case, the posture control devices 1 through 4 each include a CPU that executes instructions of a program that is software realizing the foregoing functions; a read only memory (ROM) or a storage device (each referred to as "storage medium") in which the program and various kinds of data are stored so as to be readable by a computer (or a CPU); and a random access memory (RAM) in which the program is loaded. An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be supplied to the computer via any transmission medium (such as a communication network or a broadcast wave) which allows the program to be transmitted. Note that the present invention can also be achieved in the form of a computer data signal in which the program is embodied via electronic transmission and which is embedded in a carrier wave.

[Recapitulation]

A posture control device (1, 2, 3, and 4) in accordance with Aspect 1 of the present invention controls a posture of a robot (100, 200, 300, and 400) by controlling driving of a driving section (24) included in a movable part of the robot, the posture control device including: a notification event detecting section (13) configured to detect a notification event having occurred, the notification event being an event for which a user needs to take an action in response to the robot having notified the user; and a driving control section (15) configured to control the driving section so that in a case where the notification event detecting section has detected an occurrence of the notification event, the robot takes on a notification event posture which is suited to a possible user response to the notification event.

With the above configuration, the driving control section controls the driving section included in a movable part of the robot so that in a case where the notification event detecting section detects an occurrence of a notification event, the robot takes on a notification event posture. This makes is possible for a user to easily respond to a notification event that has occurred and therefore enhances user convenience with regards to, for example, a user operation of the robot conducted in response to the notification event.

In Aspect 2 of the present invention, the posture control device (1, 2, 3, and 4) of Aspect 1 can be arranged such that (i) the posture control device further includes a grip determining section (16) configured to determine whether or not the user is gripping the robot (100, 200, 300, and 400), and (ii) the driving control section (15) controls the driving section (24) so that in a case where the grip determining section determines, while the robot is in the notification event posture, that the user has gripped the robot, the robot undergoes a transition from the notification event posture to an operation-compatible posture which is suited to an operation of the robot conducted by the user.

The above configuration enables the user to easily operate the robot while gripping the robot. This makes it possible to further enhance user convenience with regards to a user operation of the robot conducted in response to a notification event.

Note that the posture control device (1, 2, 3, and 4) in accordance with Aspect 1 or 2 can be arranged such that the driving control section (15) controls the driving section (24) so that in a case where the notification event detecting section (13) detects an incoming signal as the notification event, the robot (100, 200, 300, and 400) takes on a notification event posture associated with a registered caller/sender.

With the above configuration, in a case where, for example, an incoming call from a known caller is received, the robot is controlled to undergo a transition into a posture that, for example, makes it easy to press a button to answer the call. This makes it possible for the user to appropriately respond in accordance with a registered caller.

The posture control device (1, 2, 3, and 4) in accordance with Aspect 1 or 2 can be arranged such that in a case where (i) the notification event includes a first notification event and a second notification event each having a priority which is set in accordance with the necessity of a possible user response and (ii) the notification event detecting section (13) detects an occurrence of the second notification event in a state in which the first notification event is occurring, the driving control section (15) controls driving of the driving section (24) so that the robot takes on a notification event posture associated with whichever of the first notification event and the second notification event has a higher priority.

With the above configuration, in a case where (i) the second notification event has occurred after the first notification event, and (ii) the first notification event has a higher priority, to the driving control section can, for example, control the robot to undergo a transition into a notification event posture associated with the second notification event after the user has finished responding to the first notification event. In a case where (i) the second notification event has occurred subsequently to the first notification event and (ii) the second notification event has a higher priority, to the driving control section can, for example, control the robot to undergo a transition into a notification event posture associated with the second notification event upon occurrence of the second notification event.

This enables the user to appropriately respond to whichever notification event has a higher priority, regardless of the order in which the first notification event and the second notification event have occurred.

In Aspect 3 of the present invention, the posture control device (1, 2, 3, and 4) in accordance with Aspect 1 or 2 can be arranged such that (i) the posture control device further includes an operation detecting section (14) configured to detect, while the robot (100, 200, 300, and 400) is in the notification event posture, a user operation conducted in response to the notification event and (ii) the driving control section (15) determines, in accordance with whether or not the operation detecting section has detected the user operation, whether to control the robot to change its posture.

The above configuration enables the user to easily conduct a following action in accordance with how the user has operated the robot.

Note that the posture control device (1, 2, 3, and 4) in accordance with Aspect 3 of the present invention can be arranged such that the driving control section (15) controls the driving section (24) so that in a case where the operation detecting section (14) has detected the user operation, the driving control section (15) cancels the notification event posture.

With the above configuration, the notification event posture is cancelled in a case where the user operation has been detected. This makes it possible to change the posture of the robot to transition into a posture, such as the operation-compatible posture, which facilitates an action in accordance with to the user operation.

In the above case, because the user operation in response to the notification event is conducted before the robot finishes processing the notification event, it is unlikely that the user will conduct an operation of the robot after the robot finishes the processing. It is therefore unnecessary to maintain the notification event posture once the processing has finished. With the above configuration, the notification event posture is not needlessly maintained after the processing has finished. This enables the robot to undergo a smooth transition into the user's intended driving.

The posture control device (1, 2, 3, and 4) in accordance with Aspect 3 can be arranged such that in a case where the operation detecting section (14) does not detect the user operation before the robot (100, 200, 300, and 400) finishes processing the notification event, the driving control section (15) controls driving of the driving section (24) so as to (i) maintain the notification event posture or (ii) cause the robot to take on an operation-compatible posture suited to the user operation.

In the above case, because the user operation in response to the notification event is not conducted before the processing finishes, it is highly likely that the user will conduct an operation of the robot after the robot finishes the processing. With the above configuration, it is possible, after the robot finishes the processing, to (i) maintain the notification event posture or (ii) change the posture of the robot into an operation-compatible posture. This enables a user to easily conduct an intended response even after the robot finishes the processing.

Furthermore, the posture control device (1, 2, 3, and 4) in accordance with any one of Aspects 1 through 3 can be arranged to further include: a generation condition determining section (11) configured to determine whether or not a selected notification event generation condition has been satisfied, the selected notification event generation condition being a condition necessary to generate a selected notification event, the selected notification event being a notification event selected by the user; and a notification event generating section (12) configured to generate the selected notification event in a case where the generation condition determining section has determined that the selected notification event generation condition has been satisfied.

The above configuration enables the user to respond easily not only to a notification event occurring unexpectedly, but also to a selected notification event whose generation was intended by the user.

In Aspect 4 of the present invention, a robot (100, 200, 300, and 400) can include a posture control device in accordance with any one of Aspects 1 through 3.

The above configuration makes it possible to realize a robot having enhanced user convenience with regards to, for example, a user operation conducted in response a notification event.

The posture control device according to the foregoing aspects of the present invention may be realized by a computer. In such a case, the present invention encompasses: a posture control program (program) for the posture control device which program causes a computer to operate as the foregoing sections of the posture control device so that the posture control device can be realized by the computer; and a computer-readable storage medium storing the program therein.

The present invention is not limited to the embodiments, but can be altered by a skilled person in the art within the scope of the claims. An embodiment derived from a proper combination of technical means each disclosed in a different embodiment is also encompassed in the technical scope of the present invention. Further, it is possible to form a new technical feature by combining the technical means disclosed in the respective embodiments.

INDUSTRIAL APPLICABILITY

An embodiment of the present invention can be used to enhance user convenience with regards to, for example, a user operation of a robot conducted in response to a notification event such as an incoming signal.

REFERENCE SIGNS LIST

1, 2, 3, 4 Posture control device
11 Generation condition determining section
12 Notification event generating section
13 Notification event detecting section
14 Operation detecting section
15 Driving control section
16 Grip determining section
24 Driving section
100, 200, 300, 400 Robot

The invention claimed is:

1. A posture control device which controls a posture of a robot by controlling driving of a driving section included in a movable part of the robot, the posture control device comprising:
a notification event detecting section configured to detect an occurrence of at least one notification event of a plurality of notification events;
a driving control section configured to control the driving section so that in a case where the notification event detecting section has detected the occurrence of the at least one notification event, the robot takes on a notification event posture in accordance with the at least one notification event, the notification event posture being suited to a user response; and
a grip determining section configured to determine whether or not the user is gripping the robot, wherein
the driving control section controlling the driving section so that in a case where the grip determining section determines, while the robot is in the notification event posture, that the user has gripped the robot, the robot undergoes a transition from the notification event posture to an operation-compatible posture which is suited to receiving an operation conducted by the user to use a function of the robot.

2. A posture control device as set forth in claim 1, further comprising an operation detecting section configured to detect, while the robot is in the notification event posture, a user operation conducted in response to the at least one notification event,
the driving control section determining, in accordance with whether or not the operation detecting section has detected the user operation, whether to control the robot to change its posture.

3. A robot comprising a posture control device recited in claim 1.

4. A posture control device as set forth in claim 1, wherein the driving control section controls the driving section so that in a case where the notification event detecting section detects an incoming signal as the at least one notification event, the robot takes on a notification event posture associated with a registered caller/sender.

5. A posture control device as set forth in claim 1, wherein:
in a case where (i) the at least one notification event includes a first notification event and a second notification event each having a priority which is set in accordance with the necessity of a user response and (ii) the notification event detecting section detects an occurrence of the second notification event while the first notification event is occurring, the driving control section controls the driving section so that the robot takes on a notification event posture associated with whichever of the first notification event and the second notification event has a higher priority.

6. A method in which a posture control device controls a driving section so that a posture of a robot is controlled, the driving section being included in a movable part of the robot,
said method comprising the steps of:
(a) detecting an occurrence of at least one notification event of a plurality of notification events;
(b) controlling the driving section so that in a case where the occurrence of the at least one notification event has been detected in the step (a), the robot takes on a notification event posture in accordance with the at least one notification event, the notification event posture being suited to a user response to the at least one notification event; and
(c) determining, by a grip determining section, whether or not the user is gripping the robot, wherein
the driving section is controlled so that in a case where the grip determining section determines, while the robot is in the notification event posture, that the user has gripped the robot, the robot undergoes a transition from the notification event posture to an operation-compatible posture which is suited to receiving an operation conducted by the user to use a function of the robot.

* * * * *